(12) United States Patent
Thiel et al.

(10) Patent No.: US 7,335,421 B2
(45) Date of Patent: Feb. 26, 2008

(54) HEATABLE WINDSHIELD

(75) Inventors: James P. Thiel, Pittsburgh, PA (US); Charles S. Voeltzel, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/185,471

(22) Filed: Jul. 20, 2005

(65) Prior Publication Data

US 2007/0020465 A1    Jan. 25, 2007

(51) Int. Cl.
    *B32B 17/06*    (2006.01)
(52) U.S. Cl. ........................... 428/432; 428/428
(58) Field of Classification Search .............. 428/428, 428/432
See application file for complete search history.

(56) References Cited

U.S. PATENT DOCUMENTS

| | | | |
|---|---|---|---|
| 3,762,988 A | 10/1973 | Clock et al. ............... 161/183 |
| 4,287,107 A | 9/1981 | Hermann et al. ....... 260/28.5 R |
| 4,379,040 A | 4/1983 | Gillery ................... 204/192 P |
| 4,466,562 A | 8/1984 | DeTorre ........................ 225/2 |
| 4,504,109 A | 3/1985 | Taga et al. ................... 350/1.6 |
| 4,610,771 A | 9/1986 | Gillery ..................... 204/192.1 |
| 4,668,270 A | 5/1987 | Ramus ......................... 65/106 |
| 4,671,155 A | 6/1987 | Goldinger ..................... 83/886 |
| 4,716,086 A | 12/1987 | Gillery et al. ............... 428/630 |
| 4,746,347 A | 5/1988 | Sensi ............................ 65/94 |
| 4,792,536 A | 12/1988 | Pecoraro et al. ........ 204/192.27 |
| 4,806,220 A | 2/1989 | Finley .................... 204/192.27 |
| 4,834,857 A | 5/1989 | Gillery .................. 204/192.27 |
| 4,861,669 A | 8/1989 | Gillery ........................ 428/434 |
| 4,898,789 A | 2/1990 | Finley ......................... 428/623 |
| 4,898,790 A | 2/1990 | Finley ......................... 428/623 |
| 4,900,633 A | 2/1990 | Gillery ........................ 428/432 |
| 4,902,580 A | 2/1990 | Gillery ........................ 428/623 |
| 4,920,006 A | 4/1990 | Gillery ........................ 428/432 |
| 4,938,857 A | 7/1990 | Gillery ................... 204/192.27 |
| 4,948,677 A | 8/1990 | Gillery ........................ 428/623 |
| 4,952,423 A | 8/1990 | Hirata et al. ................. 427/109 |
| 5,028,759 A | 7/1991 | Finley ......................... 219/203 |
| 5,030,593 A | 7/1991 | Heithoff ........................ 501/72 |
| 5,030,594 A | 7/1991 | Heithoff ........................ 501/72 |
| 5,059,295 A | 10/1991 | Finley .................... 204/192.27 |
| 5,240,886 A | 8/1993 | Gulotta et al. ................. 501/70 |
| 5,328,768 A | 7/1994 | Goodwin ..................... 428/428 |
| 5,385,872 A | 1/1995 | Gullota et al. ................. 501/71 |
| 5,393,593 A | 2/1995 | Gullota et al. .............. 428/220 |
| 5,492,750 A | 2/1996 | Shumaker, Jr. et al. ..... 428/192 |

(Continued)

FOREIGN PATENT DOCUMENTS

EP    0 378 917    7/1990

(Continued)

*Primary Examiner*—G. Blackwell
(74) *Attorney, Agent, or Firm*—Andrew C. Siminerio (57) ABSTRACT

A heatable transparency includes a first ply having a No. 1 surface and a No. 2 surface and a second ply having a No. 3 surface and a No. 4 surface. The No. 2 surface faces the No. 3 surface. An electrically conductive coating is formed on at least a portion of the No. 2 or No. 3 surface, with the conductive coating including three or more metallic silver layers. An antireflective coating is formed on the No. 4 surface.

17 Claims, 3 Drawing Sheets

U.S. PATENT DOCUMENTS

| | | |
|---|---|---|
| 5,653,903 A | 8/1997 | Pinchok, Jr. et al. ....... 219/203 |
| 5,796,055 A | 8/1998 | Benson, Jr. et al. ........ 181/208 |
| 5,821,001 A | 10/1998 | Arbab et al. ................ 428/623 |
| 6,495,251 B1 | 12/2002 | Arbab ........................ 428/336 |
| 6,869,644 B2 | 3/2005 | Buhay et al. ............ 427/419.2 |
| 6,916,542 B2 | 7/2005 | Buhay et al. ............... 428/432 |
| 2002/0172775 A1 | 11/2002 | Buhay et al. ............ 427/376.2 |
| 2003/0180547 A1 | 9/2003 | Buhay ........................ 428/208 |
| 2003/0228476 A1 | 12/2003 | Buhay et al. ............... 428/469 |
| 2003/0228484 A1 | 12/2003 | Finley et al. ............... 428/577 |
| 2004/0023038 A1 | 2/2004 | Buhay et al. ............... 428/432 |
| 2004/0259716 A1* | 12/2004 | Coster et al. ................. 501/70 |
| 2005/0178756 A1* | 8/2005 | Degand et al. ............. 219/203 |

FOREIGN PATENT DOCUMENTS

| | | |
|---|---|---|
| EP | 1 466 877 A1 | 10/2004 |
| GB | 2302102 | 1/1997 |
| GB | 2 311 540 | 10/1997 |
| WO | 01/68395 A1 | 9/2001 |

* cited by examiner

HEATABLE WINDSHIELD

BACKGROUND OF THE INVENTION

1. Field of the Invention

This invention relates generally to vehicle transparencies, such as vehicle windshields, and, in one particular embodiment, to a heatable vehicle windshield.

2. Technical Considerations

It has been known to pass electric current through a conductor (e.g., a wire or an electrically conductive coating) on a laminated vehicle windshield in order to raise the temperature of the windshield. This is particularly useful in colder climates for defogging and to melt ice and snow on the windshield.

In wire-heated windshields, fine electrically-conductive wires are placed between the windshield plies. The wires are connected to a power source, such as a conventional 14 volt (v) vehicle alternator. The wires have sufficiently low resistance to provide the windshield with a power density of 5 to 7 watts per decimeter squared ($W/dm^2$).

However, a problem with wire-heated windshields is that the wires can be seen by the vehicle occupants. The presence of these wires can be aesthetically undesirable and can interfere with visibility through the windshield. If the diameter of the wires is decreased to try to reduce the visibility of the wires, the number of wires must be increased to maintain the desired power density. The increased number of wires adversely decreases the total solar energy transmitted (TSET) of the windshield. If the height of the windshield increases, the wires must be longer to maintain the desired power density. These longer wires are also undesirable with respect to windshield aesthetics and/or transmittance.

In an effort to address this problem, some heated windshields utilize transparent, conductive coatings rather than wires to heat the windshield. While these known transparent coatings overcome the aesthetic and visibility problems associated with the use of wires, conventional heated windshield coatings also have some drawbacks. For example, conventional heated windshield coatings typically have a sheet resistance of 2 ohms per square ($\Omega/\square$) or greater. A conventional 14v (80 ampere; 1,120 watts) alternator does not provide sufficient voltage to power a conventional heated windshield coating to a temperature sufficient for de-icing. Therefore, for vehicles with these conventional coatings, the vehicles must be altered to increase the available voltage. One way to do this is to replace the conventional 14v (1,120 W) alternator with a 42v (2,500 W to 5,000 W) alternator. Another way to address this problem is to maintain the conventional 14v alternator but add a DC to DC converter to step up the voltage to a sufficient level, e.g., 42v, to heat the windshield to a commercially acceptable level.

However, replacing the conventional 14v alternator or adding a DC to DC converter increases the cost and complexity of the vehicle electrical system. Also, as one skilled in the art will appreciate, all things being equal, a system that functions on 14 volts is typically safer to operate than one that operates on 42 volts.

Therefore, it would be desirable to provide a transparency, such as a laminated vehicle transparency, that reduces or eliminates at least some of the problems associated with conventional heatable transparencies.

SUMMARY OF THE INVENTION

A heatable transparency of the invention comprises a first ply having a No. 1 surface and a No. 2 surface and a second ply having a No. 3 surface and a No. 4 surface. The No. 2 surface faces the No. 3 surface. A conductive coating is formed on the No. 2 or No. 3 surface. A power supply is in contact with the conductive coating. The system is configured such that the power supply provides less than 42 volts to the conductive coating. In one non-limiting embodiment, the system is configured such that the power supply provides less than 24 volts, such as in the range of 13 volts to 15 volts to the conductive coating. In one non-limiting embodiment, the coating provides a power density in the range of 4 $W/dm^2$ to 8 $W/dm^2$, e.g., 5 $W/dm^2$ to 7 $W/dm^2$.

A further heatable transparency comprises a first ply having a No.1 surface and a No. 2 surface and a second ply having a No. 3 surface and a No. 4 surface. The No. 2 surface faces the No. 3 surface. A conductive coating is formed on the No. 2 or No. 3 surface, with the conductive coating comprising three or more metallic silver layers. An antireflective coating can be formed on the No. 4 surface.

A further heatable laminated transparency comprises a first ply having a No. 1 surface and a No. 2 surface and a second ply having a No. 3 surface and a No. 4 surface. The No. 2 surface faces the No. 3 surface. A conductive coating is formed on the No. 2 or No. 3 surface. The conductive coating comprises three or more metallic silver layers and the conductive coating is configured to provide a resistivity in the range of 0.6 $\Omega/\square$ to 1.70 $\Omega/\square$. An antireflective coating is formed on the No. 4 surface. In one embodiment, the antireflective coating comprises at least one zinc stannate layer and at least one zinc oxide layer. The laminated transparency can have a visible light transmittance of greater than or equal to 70% at a reference wavelength of 550 nm.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range-values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. Additionally, all documents, such as but not limited to issued patents and patent applications, referred to herein are to be considered to be "incorporated by reference" in their entirety. The "visible transmittance" and "dominant wavelength" values are those determined using the conventional methods. Those skilled in the art will understand that properties such as visible transmittance and dominant wavelength can be calculated at an equivalent standard thickness, e.g., 5.5 mm, even though the actual thickness of a measured glass sample is different than the standard thickness.

For purposes of the following discussion, the invention will be discussed with reference to use with a vehicle transparency, in particular an automotive windshield. However, it is to be understood that the invention is not limited to use with vehicle windshields but could be practiced in any desired field, such as but not limited to laminated or non-laminated residential and/or commercial windows, insulating glass units, and/or transparencies for land, air, space, above water and under water vehicles, e.g., automotive windshields, sidelights, back lights, sunroofs, and moon roofs, just to name a few. Therefore, it is to be understood that the specifically disclosed exemplary embodiments are presented simply to explain the general concepts of the invention and that the invention is not limited to these specific exemplary embodiments. Additionally, while a typical vehicle "transparency" can have sufficient visible light transmittance such that materials can be viewed through the transparency, in the practice of the invention the "transparency" need not be transparent to visible light but may be translucent or opaque (as described below). Non-limiting examples of vehicle windshields and methods of making the same are found in U.S. Pat. Nos. 4,820,902; 5,028,759; and 5,653,903.

Figure 1:
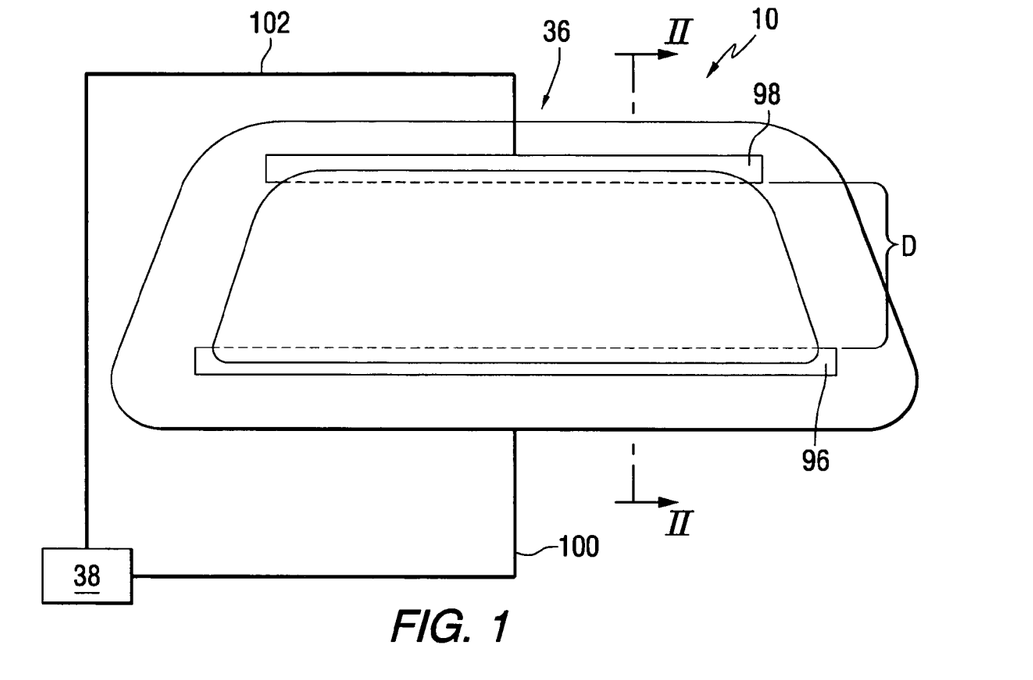
FIG. 1 is a schematic view (not to scale) of a heatable windshield incorporating features of the invention.
Figure 2:
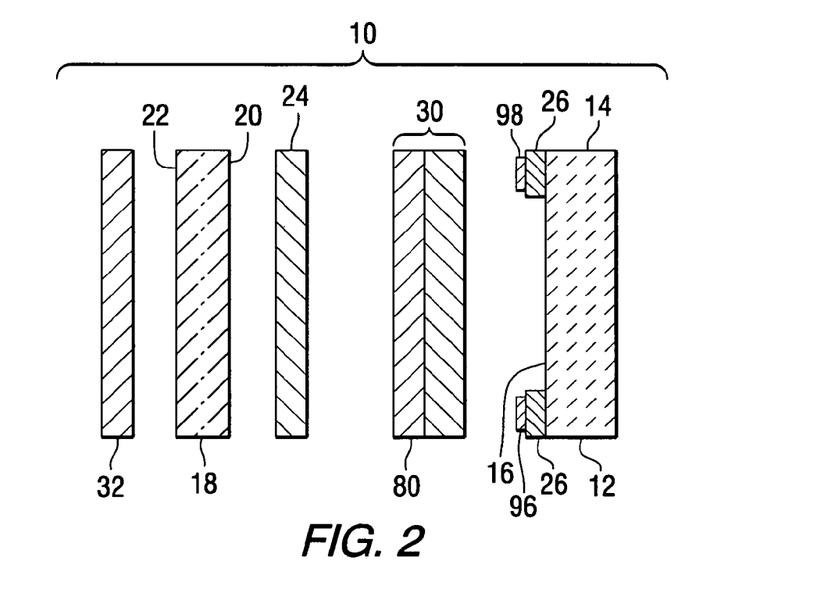
FIG. 2 is an expanded view (not to scale) of the windshield taken along the line II-II of FIG. 1.

A non-limiting heatable transparency 10 (e.g., automotive windshield) incorporating features of the invention is illustrated in FIGS. 1 and 2. The transparency 10 can have any desired visible light, infrared radiation, or ultraviolet radiation transmission and reflection. For example, the transparency 10 can have a visible light transmission of any desired amount, e.g., greater than 0% to 100%, e.g., greater than 70%. For windshield and front sidelight areas in the United States, the visible light transmission is typically greater than or equal to 70%. For privacy areas, such as rear seat sidelights and rear windows, the visible light transmission can be less than that for windshields, such as less than 70%.

As best seen in FIG. 2, the transparency 10 includes a first ply 12 with a first major surface facing the vehicle exterior, i.e., an outer major surface 14 (No. 1 surface) and an opposed second or inner major surface 16 (No. 2 surface). The transparency 10 also includes a second ply 18 having an outer (first) major surface 20 (No. 3 surface) and an inner (second) major surface 22 (No. 4 surface). This numbering of the ply surfaces is in keeping with conventional practice in the automotive art. The first and second plies 12, 18 can be bonded together in any suitable manner, such as by a conventional interlayer 24. Although not required, a conventional edge sealant can be applied to the perimeter of the laminated transparency 10 during and/or after lamination in any desired manner. A decorative band, e.g., an opaque, translucent or colored shade band 26 (shown in FIG. 2), such as a ceramic band, can be provided on a surface of at least one of the plies 12, 18, for example around the perimeter of the inner major surface 16 of the first ply 12. An electrically conductive coating 30 is formed over at least a portion of one of the plies 12, 18, such as over the No. 2 surface 16 or No. 3 surface 20. An antireflective coating 32 is formed over at least one of the surfaces, such as over the No. 4 surface 22. A bus bar assembly 36 (FIG. 1) is in electrical contact with the conductive coating 30. The bus bar assembly 36 is also connected to an electrical power source 38 (FIG. 1) and will be discussed in more detail below. In one non-limiting aspect of the invention, the power source 38 can be a conventional vehicle alternator, e.g., configured to supply approximately 14 volts. Thus, in the practice of one non-limiting embodiment of the invention, no DC to DC power converter is present, as is required in the known art.

In the broad practice of the invention, the plies 12, 18 of the transparency 10 can be of the same or different materials. The plies 12, 18 can include any desired material having any desired characteristics. For example, one or more of the plies 12, 18 can be transparent or translucent to visible light. By "transparent" is meant having visible light transmittance of greater than 0% to 100%. Alternatively, one or more of the plies 12, 18 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies 12, 18 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated"

means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. The ribbon is then cut and/or shaped and/or heat treated as desired. Examples of float glass processes are disclosed in U.S. Pat. Nos. 4,466,562 and 4,671,155. The first and second plies 12, 18 can each be, for example, clear float glass or can be tinted or colored glass or one ply 12, 18 can be clear glass and the other ply 12, 18 colored glass. Although not limiting to the invention, examples of glass suitable for the first ply 12 and/or second ply 18 are described in U.S. Pat. Nos. 4,746,347; 4,792,536; 5,030,593; 5,030,594; 5,240,886; 5,385,872; and 5,393,593. The first and second plies 12, 18 can be of any desired dimensions, e.g., length, width, shape, or thickness. In one exemplary automotive transparency, the first and second plies can each be 1 mm to 10 mm thick, e.g., 1 mm to 5 mm thick, or 1.5 mm to 2.5 mm, or 1.8 mm to 2.3 mm. In one non-limiting embodiment, the first ply 12 and/or second ply 18 can have a visible light transmittance of greater than 90%, such as greater than 91%, at a reference wavelength of 550 nm. The glass composition for the first ply 12 and/or second ply 18 can have a total iron content in the range of greater than 0 wt. % to 0.2 wt. % and/or a redox ratio in the range of 0.3 to 0.6.

In one non-limiting embodiment, one or both of the plies 12, 18 may have a high visible light transmittance at a reference wavelength of 550 nanometers (nm). By "high visible light transmittance" is meant visible light transmittance at 550 nm greater than or equal to 85%, such as greater than or equal to 87%, such as greater than or equal to 90%, such as greater than or equal to 91%, such as greater than or equal to 92%, at 5.5 mm equivalent thickness for glass from 2 mm to 25 mm sheet thickness. Particularly useful glass for the practice of the invention is disclosed in U.S. Pat. Nos. 5,030,593 and 5,030,594 and is commercially available from PPG Industries, Inc. under the mark Starphire®.

The interlayer 24 can be of any desired material and can include one or more layers or plies. The interlayer 24 can be a polymeric or plastic material, such as, for example, polyvinylbutyral, plasticized polyvinyl chloride, or multi-layered thermoplastic materials including polyethyleneterephthalate, etc. Suitable interlayer materials are disclosed, for example but not to be considered as limiting, in U.S. Pat. Nos. 4,287,107 and 3,762,988. The interlayer 24 secures the first and second plies 12, 18 together, provides energy absorption, reduces noise, and increases the strength of the laminated structure. The interlayer 24 can also be a sound-absorbing or attenuating material as described, for example, in U.S. Pat. No. 5,796,055. The interlayer 24 can have a solar control coating provided thereon or incorporated therein or can include a colored material to reduce solar energy transmission.

The coating 30 is an electrically conductive coating deposited over at least a portion of a major surface of one of the glass plies 12, 18, such as on the inner surface 16 of the outboard glass ply 12 (FIG. 2) or the outer surface 20 of the inner glass ply 18. The conductive coating 30 can include one or more metallic films positioned between pairs of dielectric layers applied sequentially over at least a portion of one of the glass plies 12, 18. The conductive coating 30 can be a heat and/or radiation reflecting coating and can have one or more coating layers or films of the same or different composition and/or functionality. As used herein, the term "film" refers to a coating region of a desired or selected coating composition. A "layer" can comprise one or more "films" and a "coating" or "coating stack" can comprise one or more "layers". For example, the conductive coating 30 can be a single layer coating or a multi-layer coating and can include one or more metals, non-metals, semi-metals, semiconductors, and/or alloys, compounds, compositions, combinations, or blends thereof. For example, the conductive coating 30 can be a single layer metal oxide coating, a multiple layer metal oxide coating, a non-metal oxide coating, a metallic nitride or oxynitride coating, a non-metallic nitride or oxynitride coating, or a multiple layer coating comprising one or more of any of the above materials. In one non-limiting embodiment, the conductive coating 30 can be a doped metal oxide coating.

The coating 30 can be a functional coating. As used herein, the term "functional coating" refers to a coating that modifies one or more physical properties of the substrate over which it is deposited, e.g., optical, thermal, chemical or mechanical properties, and is not intended to be entirely removed from the substrate during subsequent processing. The conductive coating 30 can have one or more functional coating layers or films of the same or different composition or functionality.

The conductive coating 30 can be, for example, an electrically conductive coating used to make heatable windows as disclosed in U.S. Pat. Nos. 5,653,903 and 5,028,759, or a single-film or multi-film coating used as an antenna. Likewise, the conductive coating can be a conductive, solar control coating. As used herein, the term "solar control coating" refers to a coating comprised of one or more layers or films that affect the solar properties of the coated article, such as but not limited to the amount of solar radiation, for example, visible, infrared, or ultraviolet radiation, reflected from, absorbed by, or passing through the coated article, shading coefficient, emissivity, etc. The solar control coating can block, absorb or filter selected portions of the solar spectrum, such as but not limited to the IR, UV, and/or visible spectrums. Examples of solar control coatings that can be used in the practice of the invention are found, for example but not to be considered as limiting, in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440.

The conductive coating 30 can also be an electroconductive low emissivity coating that allows visible wavelength energy to be transmitted through the coating but reflects longer wavelength solar infrared energy. By "low emissivity" is meant emissivity less than 0.4, such as less than 0.3, such as less than 0.2, such as less than 0.1, e.g., less than or equal to 0.05. Examples of low emissivity coatings are found, for example, in U.S. Pat. Nos. 4,952,423 and 4,504,109 and British reference GB 2,302,102.

Non-limiting examples of suitable conductive coatings 30 for use with the invention are commercially available from PPG Industries, Inc. of Pittsburgh, Pa. under the SUNGATE® and SOLARBAN® families of coatings. Such coatings typically include one or more antireflective coating films comprising dielectric or anti-reflective materials, such as metal oxides or oxides of metal alloys, which are transparent to visible light. The conductive coating 30 can also include one or more infrared reflective films comprising a reflective metal, e.g., a noble metal such as gold, copper or silver, or combinations or alloys thereof, and can further comprise a primer film or barrier film, such as titanium, as is known in the art, located over and/or under the metal reflective layer. The conductive coating 30 can have any desired number of infrared reflective films, such as but not limited to 1 to 5 infrared reflective films. In one non-limiting embodiment, the coating 30 can have 1 or more silver layers, e.g., 2 or more silver layers, e.g., 3 or more silver layers, such as 5 or more silver layers. A non-limiting example of a suitable coating having three silver layers is disclosed in U.S. patent application Ser. No. 10/364,089 (Publication No. 2003/0180547 A1).

The conductive coating 30 can be deposited by any conventional method, such as but not limited to conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as but not limited to sol-gel deposition. In one non-limiting embodiment, the conductive coating 30 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

Figure 3:
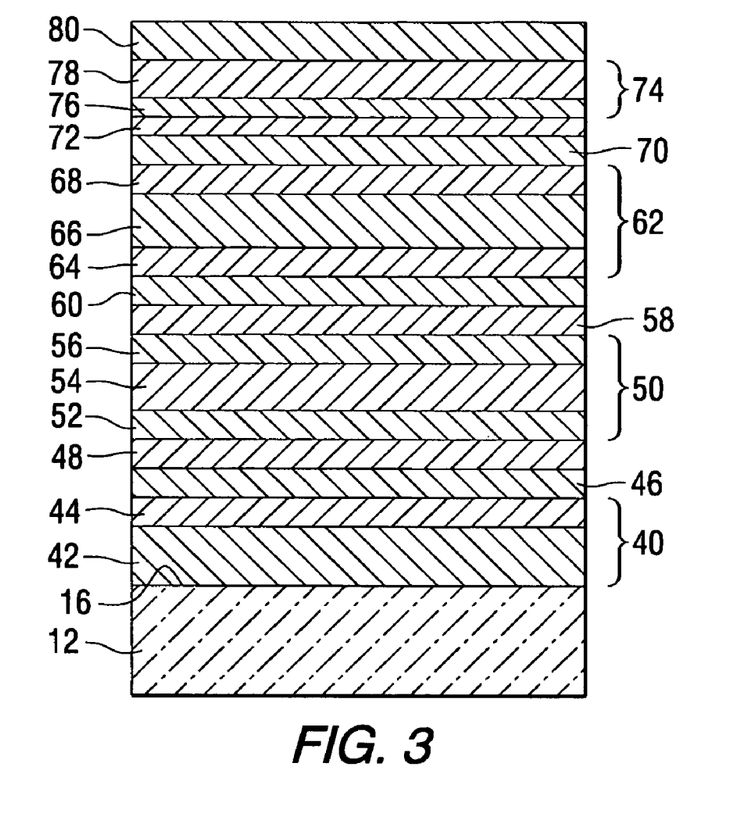
FIG. 3 is a cross-sectional view (not to scale) of a non-limiting conductive coating suitable for the invention.

An exemplary non-limiting coating 30 suitable for the invention is shown in FIG. 3. This exemplary coating 30 includes a base layer or first dielectric layer 40 deposited over at least a portion of a major surface of a substrate (e.g., the No. 2 surface 16 of the first ply 12). The first dielectric layer 40 can comprise one or more films of antireflective materials and/or dielectric materials, such as but not limited to metal oxides, oxides of metal alloys, nitrides, oxynitrides, or mixtures thereof. The first dielectric layer 40 can be transparent to visible light. Examples of suitable metal oxides for the first dielectric layer 40 include oxides of titanium, hafnium, zirconium, niobium, zinc, bismuth, lead, indium, tin, and mixtures thereof. These metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 40 can be a substantially single phase film, such as a metal alloy oxide film, e.g., zinc stannate, or can be a mixture of phases composed of zinc and tin oxides or can be composed of a plurality of metal oxide films, such as those disclosed in U.S. Pat. Nos. 5,821,001; 4,898,789; and 4,898,790.

In the illustrated exemplary embodiment shown in FIG. 3, the first dielectric layer 40 can comprise a multi-film structure having a first film 42, e.g., a metal alloy oxide film, deposited over at least a portion of the inner major surface 16 of the first ply 12 and a second film 44, e.g., a metal oxide or oxide mixture film, deposited over the first metal alloy oxide film 42. In one non-limiting embodiment, the first film 42 can be a zinc/tin alloy oxide. The zinc/tin alloy oxide can be that obtained from magnetron sputtering vacuum deposition from a cathode of zinc and tin that can comprise zinc and tin in proportions of 10 wt. % to 90 wt. % zinc and 90 wt. % to 10 wt. % tin. One suitable metal alloy oxide that can be present in the first film 42 is zinc stannate. By "zinc stannate" is meant a composition of $Zn_xSn_{1-x}O_{2-x}$ (Formula 1) where "x" varies in the range of greater than 0 to less than 1. For instance, "x" can be greater than 0 and can be any fraction or decimal between greater than 0 to less than 1. For example where x=⅔, Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the film. In one non-limiting embodiment, the first film 42 comprises zinc stannate and has a thickness in the range of 100 Å to 500 Å, such as 150 Å to 400 Å, e.g., 200 Å to 300 Å, e.g., 260 Å.

The second film 44 can be a zinc-containing film, such as zinc oxide. The zinc oxide film can be deposited from a zinc cathode that includes other materials to improve the sputtering characteristics of the cathode. For example, the zinc cathode can include a small amount (e.g., less than 10 wt. %, such as greater than 0 to 5 wt. %) of tin to improve sputtering. In which case, the resultant zinc oxide film would include a small percentage of tin oxide, e.g., 0 to less than 10 wt. % tin oxide, e.g., 0 to 5 wt. % tin oxide. An oxide layer sputtered from a zinc/tin cathode having ninety-five percent zinc and five percent tin is written as $Zn_{0.95}Sn_{0.05}O_{1.05}$ herein and is referred to as a zinc oxide film. The small amount of tin in the cathode (e.g., less than 10 wt. %) is believed to form a small amount of tin oxide in the predominantly zinc oxide-containing second film 44. The second film 44 can have a thickness in the range of 50 Å to 200 Å, such as 75 Å to 150 Å, e.g., 100 Å. In one non-limiting embodiment in which the first film 42 is zinc stannate and the second film 44 is zinc oxide ($Zn_{0.95}Sn_{0.05}O_{1.05}$), the first dielectric layer 40 can have a total thickness of less than or equal to 1,000 Å, such as less than or equal to 500 Å, e.g., 300 Å to 450 Å, e.g., 350 Å to 425 Å, e.g., 400 Å.

A first heat and/or radiation reflective film or layer 46 can be deposited over the first dielectric layer 40. The first reflective layer 46 can include a reflective metal, such as but not limited to metallic gold, copper, silver, or mixtures, alloys, or combinations thereof. In one embodiment, the first reflective layer 46 comprises a metallic silver layer having a thickness in the range of 25 Å to 300 Å, e.g., 50 Å to 300 Å, e.g., 50 Å to 200 Å, such as 70 Å to 150 Å, such as 100 Å to 150 Å, e.g., 130 Å.

A first primer film 48 can be deposited over the first reflective layer 46. The first primer film 48 can be an oxygen-capturing material, such as titanium, that can be sacrificial during the deposition process to prevent degradation or oxidation of the first reflective layer 46 during the sputtering process or subsequent heating processes. The oxygen-capturing material can be chosen to oxidize before the material of the first reflective layer 46. If titanium is used as the first primer film 48, the titanium would preferentially oxidize to titanium dioxide before oxidation of the underlying silver layer. In one embodiment, the first primer film 48 is titanium having a thickness in the range of 5 Å to 50 Å, e.g., 10 Å to 40 Å, e.g., 15 Å to 25 Å, e.g., 20 Å.

An optional second dielectric layer 50 can be deposited over the first reflective layer 46 (e.g., over the first primer film 48). The second dielectric layer 50 can comprise one or more metal oxide or metal alloy oxide-containing films, such as those described above with respect to the first dielectric layer. In the illustrated non-limiting embodiment, the second dielectric layer 50 includes a first metal oxide film 52, e.g., a zinc oxide ($Zn_{0.95}Sn_{0.05}O_{1.05}$) film deposited over the first primer film 48. A second metal alloy oxide film 54, e.g., a zinc stannate ($Zn_2SnO_4$) film, can be deposited over the first zinc oxide ($Zn_{0.95}Sn_{0.05}O_{1.05}$) film 52. A third metal oxide film 56, e.g., another zinc/tin oxide layer ($Zn_{0.95}Sn_{0.05}O_{1.05}$), can be deposited over the zinc stannate layer to form a multi-film second dielectric layer 50. In one non-limiting embodiment, the zinc oxide ($Zn_{0.95}Sn_{0.05}O_{1.05}$) films 52, 56 of the second dielectric layer 50 can each have a thickness in the range of about 50 Å to 200 Å, e.g., 75 Å to 150 Å, e.g., 100 Å. The metal alloy oxide layer (zinc stannate) 54 can have a thickness in the range of 100 Å to 800 Å, e.g., 200 Å to 700 Å, e.g., 300 Å to 600 Å, e.g., 550 Å to 600 Å.

An optional second heat and/or radiation reflective layer 58 can be deposited over the second dielectric layer 50. The second reflective layer 58 can include any one or more of the reflective materials described above with respect to the first reflective layer 46. In one non-limiting embodiment, the second reflective layer 58 comprises silver having a thickness in the range of 25 Å to 200 Å, e.g., 50 Å to 150 Å, e.g., 80 Å to 150 Å, e.g., 100 Å to 150 Å, e.g., 130 Å. In another non-limiting embodiment, this second reflective layer 58 can be thicker than the first and/or third reflective layers (the third reflective layer to be discussed later).

An optional second primer film 60 can be deposited over the second reflective layer 58. The second primer film 60 can be any of the materials described above with respect to the first primer film 48. In one non-limiting embodiment, the second primer film includes titanium having a thickness in the range of about 5 Å to 50 Å, e.g., 10 Å to 25 Å, e.g., 15 Å to 25 Å, e.g., 20 Å.

An optional third dielectric layer 62 can be deposited over the second reflective layer 58 (e.g., over the second primer film 60). The third dielectric layer 62 can also include one or more metal oxide or metal alloy oxide-containing layers, such as discussed above with respect to the first and second dielectric layers 40, 50. In one non-limiting embodiment, the third dielectric layer 62 is a multi-film layer similar to the second dielectric layer 50. For example, the third dielectric layer 62 can include a first metal oxide layer 64, e.g., a zinc oxide ($Zn_{0.95}Sn_{0.05}O_{1.05}$) layer, a second metal alloy oxide-containing layer 66, e.g., a zinc stannate layer ($Zn_2SnO_4$), deposited over the zinc oxide layer 64, and a third metal oxide layer 68, e.g., another zinc oxide ($Zn_{0.95}Sn_{0.05}O_{1.05}$) layer, deposited over the zinc stannate layer 66. In one non-limiting embodiment, the zinc oxide layers 64, 68 can have thicknesses in the range of 50 Å to 200 Å, such as 75 Å to 150 Å, e.g., 100 Å. The metal alloy oxide layer 66 can have a thickness in the range of 100 Å to 800 Å, e.g., 200 Å to 700 Å, e.g., 300 Å to 600 Å, e.g., 550 Å to 600 Å.

In one non-limiting aspect of the invention, the second dielectric layer 50 and third dielectric layer 62 have thicknesses that are within 10% of each other, such as within 5%, such as within 2% to 3% of each other.

The coating 30 can further include an optional third heat and/or radiation reflective layer 70 deposited over the third dielectric layer 62. The third reflective layer 70 can be of any of the materials discussed above with respect to the first and second reflective layers. In one non-limiting embodiment, the third reflective layer 70 includes silver and has a thickness in the range of 25 Å to 300 Å, e.g., 50 Å to 300 Å, e.g., 50 Å to 200 Å, such as 70 Å to 150 Å, such as 100 Å to 150 Å, e.g., 120 Å. In one non-limiting embodiment, when the first, second, and/or third reflective layers have or contain silver, the total amount of silver for the coating 30 can range in the amount of 29 to 44 micrograms per centimeters$^2$ (ugm/cm$^2$), such as 36.5 ugm/cm$^2$. In one non-limiting aspect of the invention, the first reflective layer 46 and third reflective layer 70 have thicknesses that are within 10% of each other, such as within 5%, such as within 2% to 3% of each other.

An optional third primer film 72 can be deposited over the third reflective layer 70. The third primer film 72 can be of any of the primer materials described above with respect to the first or second primer films. In one non-limiting embodiment, the third primer film is titanium and has a thickness in the range of 5 Å to 50 Å, e.g., 10 Å to 25 Å, e.g., 20 Å.

An optional fourth dielectric layer 74 can be deposited over the third reflective layer (e.g., over the third primer film 72). The fourth dielectric layer 74 can be comprised of one or more metal oxide or metal alloy oxide-containing layers, such as those discussed above with respect to the first, second, or third dielectric layers 40, 50, 62. In one non-limiting embodiment, the fourth dielectric layer 74 is a multi-film layer having a first metal oxide layer 76, e.g., a zinc oxide ($Zn_{0.95}Sn_{0.05}O_{1.05}$) layer, deposited over the third primer film 72, and a second metal alloy oxide layer 78, e.g., a zinc stannate layer ($Zn_2SnO_4$), deposited over the zinc oxide layer 76. The zinc oxide layer 76 can have a thickness in the range of 25 Å to 200 Å, such as 50 Å to 150 Å, such as 100 Å. The zinc stannate layer 78 can have a thickness in the range of 25 Å to 500 Å, e.g., 50 Å to 500 Å, e.g., 100 Å to 400 Å, e.g., 200 Å to 300 Å, e.g., 260 Å.

The coating 30 can contain additional groups of dielectric layer/reflective metal layer/primer layer units if desired. In one non-limiting embodiment, the coating 30 can contain up to five antireflective metal layers, e.g., up to five silver layers.

The coating 30 can include a protective overcoat 80, which, for example in the non-limiting embodiment shown in FIG. 3, is deposited over the optional fourth dielectric layer 74 (if present), to assist in protecting the underlying layers, such as the antireflective layers, from mechanical and chemical attack during processing. The protective coating 80 can be an oxygen barrier coating layer to prevent or reduce the passage of ambient oxygen into the underlying layers of the coating 30, such as during heating or bending. The protective coating 80 can be of any desired material or mixture of materials. In one exemplary embodiment, the protective coating 80 can include a layer having one or more metal oxide materials, such as but not limited to oxides of aluminum, silicon, or mixtures thereof. For example, the protective coating 80 can be a single coating layer comprising in the range of 0 wt. % to 100 wt. % alumina and/or 100 wt. % to 0 wt. % silica, such as 5 wt. % to 95 wt. % alumina and 95 wt. % to 5 wt. % silica, such as 10 wt. % to 90 wt. % alumina and 90 wt. % to 10 wt. % silica, such as 15 wt. % to 90 wt. % alumina and 85 wt. % to 10 wt. % silica, such as 50 wt. % to 75 wt. % alumina and 50 wt. % to 25 wt. % silica, such as 50 wt. % to 70 wt. % alumina and 50 wt. % to 30 wt. % silica, such as 35 wt. % to 100 wt. % alumina and 65 wt. % to 0 wt. % silica, e.g., 70 wt. % to 90 wt. % alumina and 30 wt. % to 10 wt. % silica, e.g., 75 wt. % to 85 wt. % alumina and 25 wt. % to 15 wt. % of silica, e.g., 88 wt. % alumina and 12 wt. % silica, e.g., 65 wt. % to 75 wt. % alumina and 35 wt. % to 25 wt. % silica, e.g., 70 wt. % alumina and 30 wt. % silica, e.g., 60 wt. % to less than 75 wt. % alumina and greater than 25 wt. % to 40 wt. % silica. Other materials, such as aluminum, chromium, hafnium, yttrium, nickel, boron, phosphorous, titanium, zirconium, and/or oxides thereof, can also be present, such as to adjust the refractive index of the protective coating 80. In one non-limiting embodiment, the refractive index of the protective coating 80 can be in the range of 1 to 3, such as 1 to 2, such as 1.4 to 2, such as 1.4 to 1.8.

In one non-limiting embodiment, the protective coating 80 is a combination silica and alumina coating. The protective coating 80 can be sputtered from two cathodes (e.g., one silicon and one aluminum) or from a single cathode containing both silicon and aluminum. This silicon/aluminum oxide protective coating 80 can be written as $Si_xAl_{1-x}O_{1.5+x/2}$, where x can vary from greater than 0 to less than 1.

Alternatively, the protective coating 80 can be a multilayer coating formed by separately formed layers of metal oxide materials, such as but not limited to a bilayer formed by one metal oxide-containing layer (e.g., a silica and/or alumina-containing first layer) formed over another metal oxide-containing layer (e.g., a silica and/or alumina-containing second layer). The individual layers of the multi-layer protective coating can be of any desired thickness.

The protective coating can be of any desired thickness. In one non-limiting embodiment, the protective coating 80 is a silicon/aluminum oxide coating ($Si_xAl_{1-x}O_{1.5+x/2}$) having a thickness in the range of 50 Å to 50,000 Å, such as 50 Å to 10,000 Å, such as 100 Å to 1,000 Å, e.g., 100 Å to 500 Å, such as 100 Å to 400 Å, such as 200 Å to 300 Å, such as 250 Å. Further, the protective coating 80 can be of non-uniform thickness. By "non-uniform thickness" is meant that the thickness of the protective coating 80 can vary over a given unit area, e.g., the protective coating 80 can have high and low spots or areas.

In another non-limiting embodiment, the protective coating 80 can comprise a first layer and a second layer formed over the first layer. In one specific non-limiting embodiment, the first layer can comprise alumina or a mixture or alloy comprising alumina and silica. For example, the first layer can comprise a silica/alumina mixture having greater than 5 wt. % alumina, such as greater than 10 wt. % alumina, such as greater than 15 wt. % alumina, such as greater than 30 wt. % alumina, such as greater than 40 wt. % alumina, such as 50 wt. % to 70 wt. % alumina, such as in the range of 70 wt. % to 100 wt. % alumina and 30 wt. % to 0 wt. % silica. In one non-limiting embodiment, the first layer can have a thickness in the range of greater than 0 Å to 1 micron, such as 50 Å to 100 Å, such as 100 Å to 250 Å, such as 101 Å to 250 Å, such as 100 Å to 150 Å, such as greater than 100 Å to 125 Å. The second layer can comprise silica or a mixture or alloy comprising silica and alumina. For example, the second layer can comprise a silica/alumina mixture having greater than 40 wt. % silica, such as greater than 50 wt. % silica, such as greater than 60 wt. % silica, such as greater than 70 wt. % silica, such as greater than 80 wt. % silica, such as in the range of 80 wt. % to 90 wt. % silica and 10 wt. % to 20 wt. % alumina, e.g., 85 wt. % silica and 15 wt. % alumina. In one non-limiting embodiment, the second layer can have a thickness in the range of greater than 0 Å to 2 microns, such as 50 Å to 5,000 Å, such as 50 Å to 2,000 Å, such as 100 Å to 1,000 Å, such as 300 Å to 500 Å, such as 350 Å to 400 Å. Non-limiting examples of suitable protective coatings are described, for example, in U.S. patent application Ser. Nos. 10/007,382; 10/133,805; 10/397,001; 10/422,094; 10/422,095; and 10/422,096.

Figure 4:
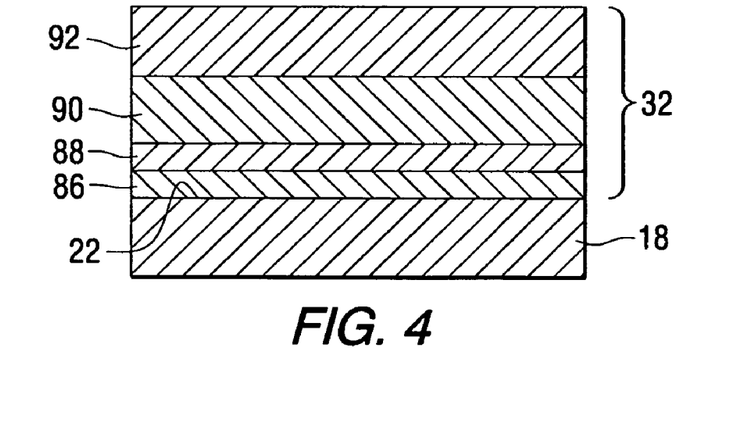
FIG. 4 is a cross-sectional view (not to scale) of a non-limiting antireflective coating suitable for the invention.

The transparency 10 further includes an antireflective coating 32, for example on the No. 4 surface 22 of the second ply 18. In one non-limiting embodiment, the antireflective coating 32 comprises alternating layers of relatively high and low index of refraction materials. A "high" index of refraction material is any material having a higher index of refraction than that of the "low" index material. In one non-limiting embodiment, the low index of refraction material is a material having an index of refraction of less than or equal to 1.75. Non-limiting examples of such materials include silica, alumina, and mixtures or combinations thereof. The high index of refraction material is a material having an index of refraction of greater than 1.75. Non-limiting examples of such materials include zirconia and zinc stannate. The antireflective coating 32 can be, for example but not limiting to the present invention, a multi-layer coating as shown in FIG. 4 having a first metal alloy oxide layer 86 (first layer), a second metal oxide layer 88 (second layer), a third metal alloy oxide layer 90 (third layer), and a metal oxide top layer 92 (fourth layer). In one non-limiting embodiment, the fourth layer 92 (upper low index layer) comprises silica or alumina or a mixture or combination thereof, the third layer 90 (upper high index layer) comprises zinc stannate or zirconia or mixtures or combinations thereof, the second layer 88 (bottom low index layer) comprises silica or alumina or a mixture or combination thereof, and the first layer 86 (bottom high index layer) comprises zinc stannate or zirconia or mixtures or combinations thereof. In one non-limiting embodiment, the top layer 92 comprises silica and ranges from 0.7 to 1.5 quarter wave, e.g., 0.71 to 1.45 quarter wave, such as 0.8 to 1.3 quarter wave, such as 0.9 to 1.1 quarter wave. By "quarter wave" is meant: physical layer thickness·4·refractive index/(reference wavelength of light). In this discussion, the reference wavelength of light is 550 nm. In this non-limiting embodiment, the thickness of the upper high index layer 90 is defined by the formula: $-0.3987 \cdot$ (quarter wave value of top layer)$^2 - 1.1576 \cdot$ (quarter wave value of top layer)$+2.7462$. Thus, if the top layer 92 is 0.96 quarter wave, the upper high index layer 90 would be $-0.3987(0.96)^2 - 1.1576(0.96) + 2.7462 = 1.2675$ quarter wave. The bottom low index layer 88 is defined by the formula: $2.0567 \cdot$ (quarter wave value of top layer)$^2 - 3.5663 \cdot$ (quarter wave value of top layer)$+1.8467$. The bottom high index layer 86 is defined by the formula: $-2.1643 \cdot$ (quarter wave value of top layer)$^2 + 4.6684 \cdot$ (quarter wave value of top layer)$-2.2187$. In one specific non-limiting embodiment, the antireflective coating 32 comprises a top layer 92 of silica of 0.96 quarter wave (88.83 nm), a layer 90 of zinc stannate of 1.2675 quarter wave (84.72 nm), a layer 88 of silica of 0.3184 quarter wave (29.46 nm), and a layer 86 of zinc stannate of 0.2683 quarter wave (17.94 nm). In other non-limiting embodiments, the quarter wave values of the layers 86, 88, and 90 can vary by ±25% from the formula values above, such as ±10%, such as ±5%.

Other suitable antireflective coatings are disclosed in U.S. Pat. No. 6,265,076 at column 2, line 53 to column 3, line 38; and Examples 1-3. Further suitable antireflective coatings are disclosed in U.S. Pat. No. 6,570,709 at column 2, line 64 to column 5, line 22; column 8, lines 12-30; column 10, line 65 to column 11, line 11; column 13, line 7 to column 14, line 46; column 16, lines 3548; column 19, line 62 to column 21, line 4; Examples 1-13; and Tables 1-8.

In the non-limiting embodiment illustrated in FIGS. 1 and 2, the bus bar assembly 36 includes a first or bottom bus bar 96 and a second or top bus bar 98 formed on the inner surface 16 of the outer ply 12 and separated by a bus bar to bus bar distance D. The bus bars 96, 98 are in electrical contact with the conductive coating 30. The bus bar assembly also includes a first conductive lead or strip 100 connected to the first bus bar 96 and a second conductive lead or strip 102 connected to the second bus bar 98. Each of the leads 100,102 is connected to the power source 38. The bus bars 96, 98 and/or the conductive strips 100, 102 can be formed of conductive metal foil or strips (such as but not limited to copper foil or tinned copper foil), or can be formed by conductive coatings (such as ceramic coatings), or combinations thereof. In one non-limiting embodiment of the invention, bus bars 96 and 98 can be positioned at least partially on, or completely on, the decorative band 26 (as shown in FIG. 2).

The power source 38 can be any conventional power source. However, in one non-limiting embodiment, the power source 38 is a conventional vehicle alternator configured to supply in the range of 13 volts to 15 volts, e.g., approximately 14 volts.

Figure 5:
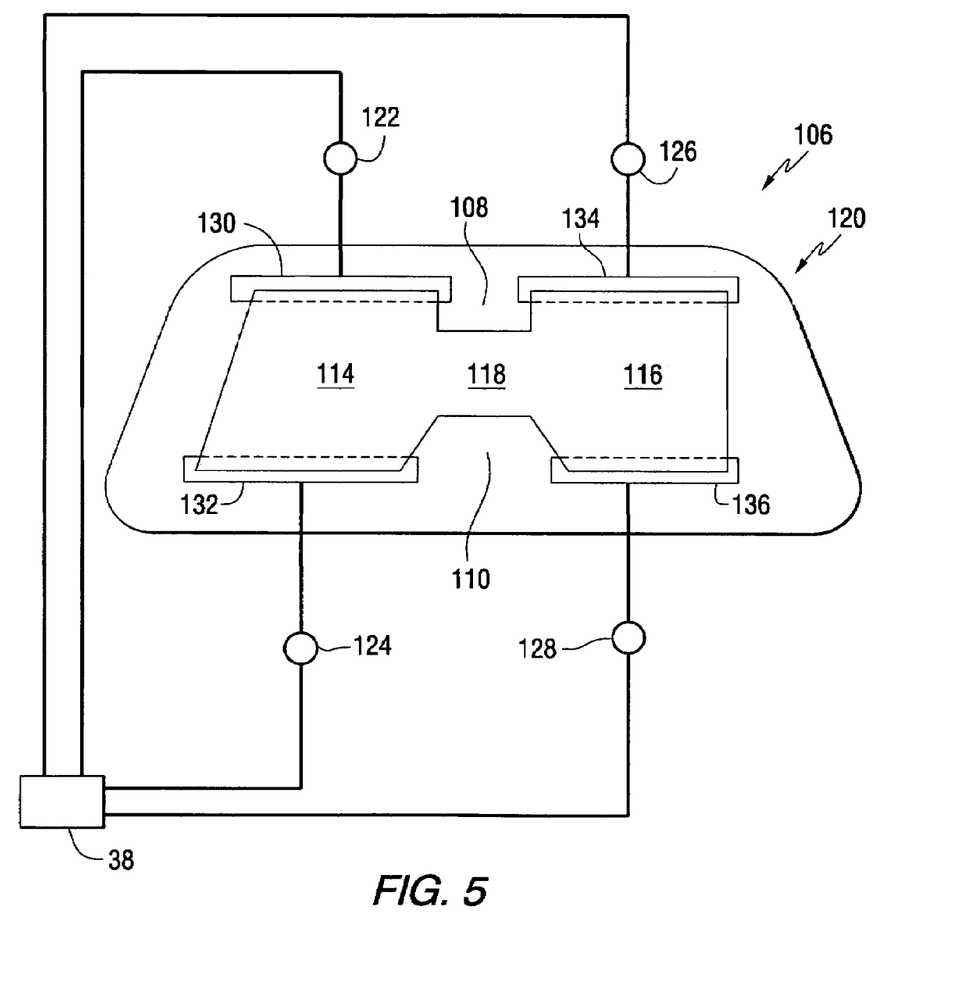
FIG. 5 is a schematic view (not to scale) of another windshield incorporating features of the invention.

A further transparency 106 incorporating features of the present invention is shown in FIG. 5. The construction of transparency 106 is similar to the transparency 10 but the coating 30 includes one or more "cut-out" areas, such as cut-outs 108 and 110. The cut outs 108 and 110 divide the coating 30 into a first major portion 114, a second major portion 116, and a central portion 118. The bus bar assembly 120 in this non-limiting embodiment is a quad-feed assembly, i.e., has four connectors 122, 124, 126, and 128 connected to four bus bars 130, 132, 134, and 136, respectively. Bus bars 130 and 132 provide power primarily to the first major portion 114 and bus bars 134 and 136 provide power primarily to the second major region 116.

In one non-limiting embodiment of the invention, the coating 30 is configured or dimensioned to provide a power density of 2 to 10 watts per decimeter$^2$ (W/dm$^2$) at a bus bar to bus bar distance D (see FIG. 1) in the range of 24 inches to 30 inches (60 cm to 75 cm), such as 4 to 8 W/dm$^2$, such as 5 to 6 W/dm$^2$, when the coating is in electrical contact with a conventional vehicle alternator, such as a conventional alternator producing 80 amps and 14 volts. It is believed that such a power density is sufficient to melt ice found in contact with outer surface 14 of the substrate 10. For vision panels (such as a windshield) in the United States, the transparency should also have a visible light transmittance of greater than or equal to 70%, such as greater than or equal to 71%. As will be appreciated by one skilled in the art, several different competing factors need to be balanced to provide a coating having sufficient conductivity and also sufficient transmittance. For example, as the distance D between the bus bars increases (i.e., the transparency becomes wider from top to bottom), the bus bar to bus bar resistance increases. As the bus bar to bus bar resistance increases, the power density decreases. In order to maintain the power density as the bus bar to bus bar distance is increased, the resistivity of the coating must decrease. One way of decreasing the resistivity is by increasing the thickness of one or more of the silver layers and/or by increasing the number of silver layers. In one non-limiting practice of the invention, the thickness and/or number of silver layers is configured to give a total resistivity for the coating of 0.6 to 1.7 Ω/□, such as 0.8 to 1.3 Ω/□, such as 0.9 to 1.1 Ω/□. However, as will also be appreciated by one skilled in the art, as the number or thickness of the silver layers increases, the visible light transmittance decreases. For forward vision areas of a vehicle, such as a windshield, the thickness and/or number of silver layers should not be increased to the point where visible light transmittance of the vision area falls below about 70%.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A heatable transparency, comprising:
   a first ply having a No. 1 surface and a No. 2 surface;
   a second ply having a No. 3 surface and a No. 4 surface, with the No. 2 surface facing the No. 3 surface;
   a vision area; and
   an electrically conductive coating formed in at least a portion of the vision area over at least a portion of the No. 2 or No. 3 surface, wherein the conductive coating comprises three or more metallic silver layers, and wherein the coating has a resistivity in the range of 0.6 Ω/□ to 1.7 Ω/□ at a supplied power in the range of 13 volts to 15 volts,
   wherein the transparency has a visible light transmittance of greater than or equal to 70% at a reference wavelength of 550 nm.

2. The transparency of claim 1, wherein the first and/or second ply have a visible light transmittance of greater than 91% at a reference wavelength of 550 nm.

3. The transparency of claim 1, wherein a glass composition for the first and/or second ply has a total iron content in the range of greater than 0 to 0.2 wt. %.

4. The transparency of claim 3, wherein the glass composition has a redox ratio in the range of 0.3 to 0.6.

5. The transparency of claim 1, wherein the conductive coating comprises at least one dielectric layer.

6. The transparency of claim 1, wherein the conductive coating includes an oxygen barrier coating layer.

7. The transparency of claim 6, wherein the oxygen barrier layer comprises at least one of silica, alumina, and combinations thereof.

8. The transparency of claim 1, further including an antireflective coating over at least a portion of the No. 2 or No. 3 or No. 4 surfaces.

9. The transparency of claim 8, wherein the antireflective coating is a multi-layer coating comprising at least one layer comprising a material having an index of refraction of less than or equal to 1.75 and at least one layer comprising a material having an index of refraction of greater than 1.75.

10. The transparency of claim 9, wherein the antireflective coating comprises a first layer having a refractive index of greater than 1.75, a second layer deposited over the first layer and having a refractive index of less than or equal to 1.75, a third layer deposited over the second layer and having a refractive index of greater than 1.75, and a fourth layer deposited over the third layer and having a refractive index of less than or equal to 1.75.

11. The transparency of claim 10, wherein the fourth layer has a thickness in the range of 0.7 to 1.5 quarter wave.

12. The transparency of claim 8, wherein the antireflective coating is on at least a portion of the No. 4 surface.

13. The transparency of claim 1, wherein the coating is configured to provide a power density in the range of 2 to 10 W/dm$^2$.

14. The transparency of claim 13, wherein the coating is configured to provide a power density in the range of 4 to 8 W/dm$^2$.

15. The transparency of claim 1, wherein the coating has a resistivity in the range of 0.8 Ω/□ to 1.3 Ω/□.

16. The transparency of claim 1, wherein the conductive coating is in electrical contact with the power supply by a bus bar assembly.

17. A heatable laminated transparency, comprising:
a first ply having a No. 1 surface and a No. 2 surface;
a second ply having a No. 3 surface and a No. 4 surface, with the No. 2 surface facing the No. 3 surface;
an electrically conductive coating formed on at least a portion of the No. 2 or No. 3 surface, the conductive coating comprising three or more metallic silver layers and the conductive coating configured to provide a resistivity in the range of 0.6 Ω/□ to 1.70 Ω/□ at a supplied power in the range of 13 volts to 15 volts; and
an antireflective coating formed on the No. 4 surface, the antireflective coating comprising at least one zinc stannate layer and at least one zinc oxide layer,
wherein the laminated transparency has a visible light transmittance of greater than or equal to 70% at a reference wavelength of 550 nm.

* * * * *